United States Patent

Millerd, Jr. et al.

[11] Patent Number: 5,836,006
[45] Date of Patent: Nov. 10, 1998

[54] APPARATUS FOR IDENTIFYING A MIS-ORIENTED TAPE CASSETTE IN A LOADER MECHANISM

[75] Inventors: Andrew Benson Millerd, Jr., San Juan Capistrano; Efren Mendez, Jr., Anaheim, both of Calif.

[73] Assignee: Tecmar Technologies, Inc., Longmont, Colo.

[21] Appl. No.: 328,594

[22] Filed: Oct. 25, 1994

Related U.S. Application Data

[63] Continuation of Ser. No. 33,398, Mar. 19, 1993, abandoned.

[51] Int. Cl.$^6$ .................................................. G11B 15/675
[52] U.S. Cl. .............................................. 360/71; 360/96.5
[58] Field of Search .............................. 360/71, 96.5, 92, 360/94; 369/34, 178

[56] References Cited

U.S. PATENT DOCUMENTS

| | | | |
|---|---|---|---|
| 4,636,903 | 1/1987 | Rudi | 360/96.5 X |
| 4,947,277 | 8/1990 | Kubota | 360/71 X |
| 5,032,939 | 7/1991 | Mihara et al. | 360/96.5 X |
| 5,089,920 | 2/1992 | Bryer et al. | 360/92 |
| 5,231,553 | 7/1993 | Weber et al. | 360/96.5 |
| 5,264,974 | 11/1993 | Campbell et al. | 360/71 X |

*Primary Examiner*—Aristotelis Psitos
*Assistant Examiner*—James L. Habermehl
*Attorney, Agent, or Firm*—Swanson & Bratschun, LLC

[57] ABSTRACT

The orientation of a tape cassette is automatically determined as it is being loaded into the tape drive by the transport mechanism. A reference edge of the cassette (for example, a predetermined lower edge of a DAT tape cassette) is characterized by a distinctive non-symmetrical profile of transparent and opaque edge portions, and a radiation source and sensor are positioned within the transport mechanism along a radiation axis that intersects an adjacent edge of the cassette as it is being loaded into the tape drive. The sensor output thereby produces a signal from which it can be determined whether the cassette is oriented with its reference edge intersecting the radiation axis. In a preferred embodiment, the output of the sensor is converted into a digital signature which is compared with a stored signature corresponding to the distinctive profile associated with the reference edge. The tape cassette may be ejected for possible manual re-orientation if the output signal from the sensor indicates the tape cassette is not properly oriented.

8 Claims, 2 Drawing Sheets

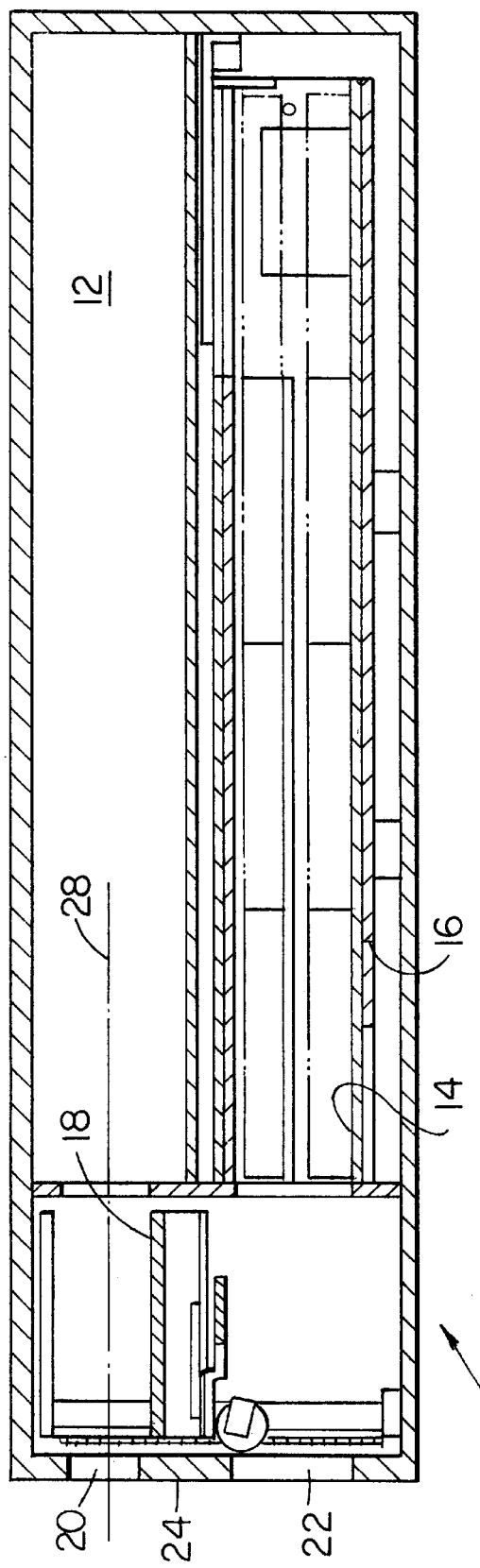
FIG. 1 (PRIOR ART)
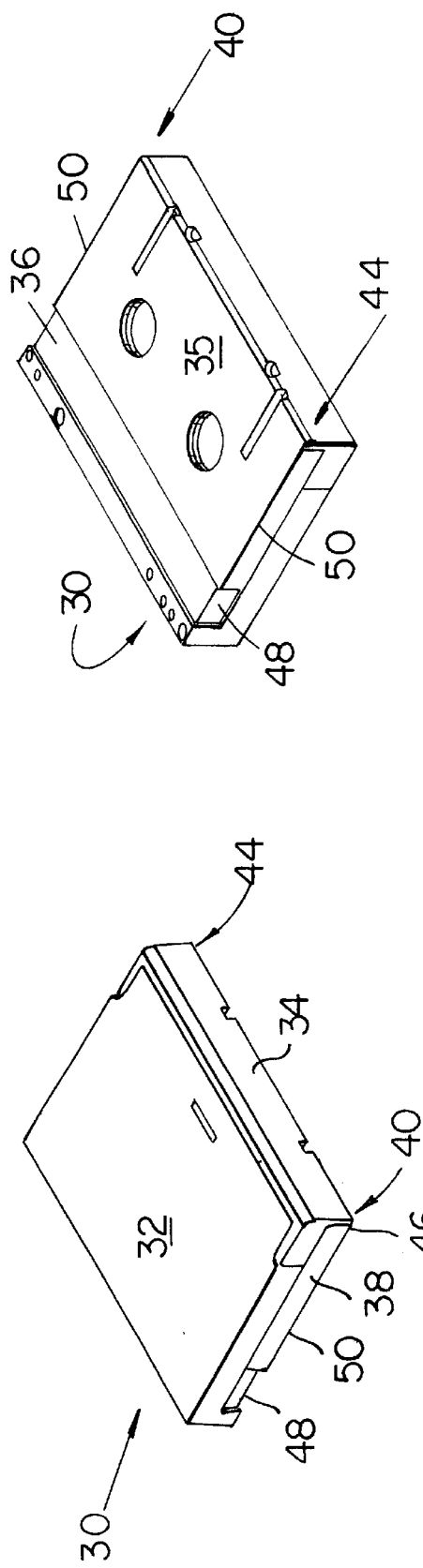
FIG. 2A (PRIOR ART)
FIG. 2B (PRIOR ART)

APPARATUS FOR IDENTIFYING A MIS-ORIENTED TAPE CASSETTE IN A LOADER MECHANISM

CROSS REFERENCE TO RELATED APPLICATIONS

This is a continuation of application Ser. No. 08/033,398 filed 19 Mar. 1993, now abandoned.

TECHNICAL FIELD

The invention relates generally to a tape drive for storing digital data on one or more tape cassettes, and more particularly to a loader apparatus for such a tape which is capable of identifying a mis-oriented tape cassette.

BACKGROUND ART

Commonly assigned U.S. Pat. No. 5,089,920 discloses and claims a novel tape drive assembly that uses DAT (Digital Audio Tape) format cassettes and a high density DAT drive assembly, in which a plurality of cassettes are stored in a cassette tray located in a magazine holding area below the drive assembly, and a transport mechanism loads and unloads a selected cassette between the tray and the tape drive. In the known drive assembly, a front bezel is provided with two openings—an upper door through which single cassettes may be individually loaded and unloaded into the tape drive, and a lower door through which an ordered sequence of cassettes stored in a cassette tray may be loaded and unloaded into the magazine holding area below the tape drive. However, if a tape cassette is improperly oriented (for example, upside down or back to front) when it is manually loaded through the upper door, or is improperly oriented in the cassette tray when the loaded cassette tray is manually loaded through the lower door, the tape drive will jam as the improperly oriented cassette is transported by the transport mechanism into contact with the tape drive.

SUMMARY OF THE INVENTION

Accordingly, it is an overall object of the present invention to avoid the limitations of the prior art by automatically determining whether the tape cassette is properly oriented as it is being loaded into the tape drive by the transport mechanism.

In a preferred embodiment, a reference edge of the cassette is characterized by a distinctive non-symmetrical profile of transparent and opaque edge portions, and a radiation source and sensor are positioned within the transport mechanism along a radiation axis that intersects an adjacent edge of the cassette as it is being loaded into the tape drive. The sensor output thereby produces a signal from which it can be determined whether the cassette is oriented with its reference edge intersecting the radiation axis.

In accordance with another aspect of the invention, the tape cassette is ejected for possible manual re-orientation if the output signal from the sensor indicates the tape cassette is not properly oriented.

In accordance with a more specific aspect of the invention, the output of the sensor is converted into a digital signature which is compared with a stored signature corresponding to the distinctive profile associated with the reference edge.

In accordance with another more specific aspect of the invention, the tape cassette is a DAT cassette and the reference edge is a predetermined lower side edge of the tape cassette having an opaque edge portion defined by a slider connecting the two lower side edges of the cassette and normally biassed to a front position in locking engagement with a front lid, and a transparent edge portion defined by a rear portion of a bottom shell that is exposed when said slider is in said front position.

BRIEF DESCRIPTION OF THE DRAWING

FIG. 1 is a somewhat abstract side cross section of a prior art tape drive assembly including a transport mechanism for loading either single DAT tape cassettes or a sequence of DAT tape cassettes stored in a cassette tray;

FIG. 2A is an isometric view of the top, front and right sides of a prior art DAT tape cassette;

FIG. 2B is an isometric view generally corresponding to FIG. 2A, but showing the bottom, front and left sides of the prior art DAT tape cassette;

FIG. 4A shows the digitized output of the sensor when the cassette is oriented properly with its reference edge in alignment with the sensor;

FIG. 4B shows the digitized output of the sensor when the cassette is oriented upside down with an completely opaque edge in alignment with the sensor; and FIG. 4C shows the digitized output of the sensor when the cassette is oriented front to back with a mirror image of the reference edge in alignment with the sensor.

DETAILED DESCRIPTION OF A PREFERRED EMBODIMENT

Figure 3:
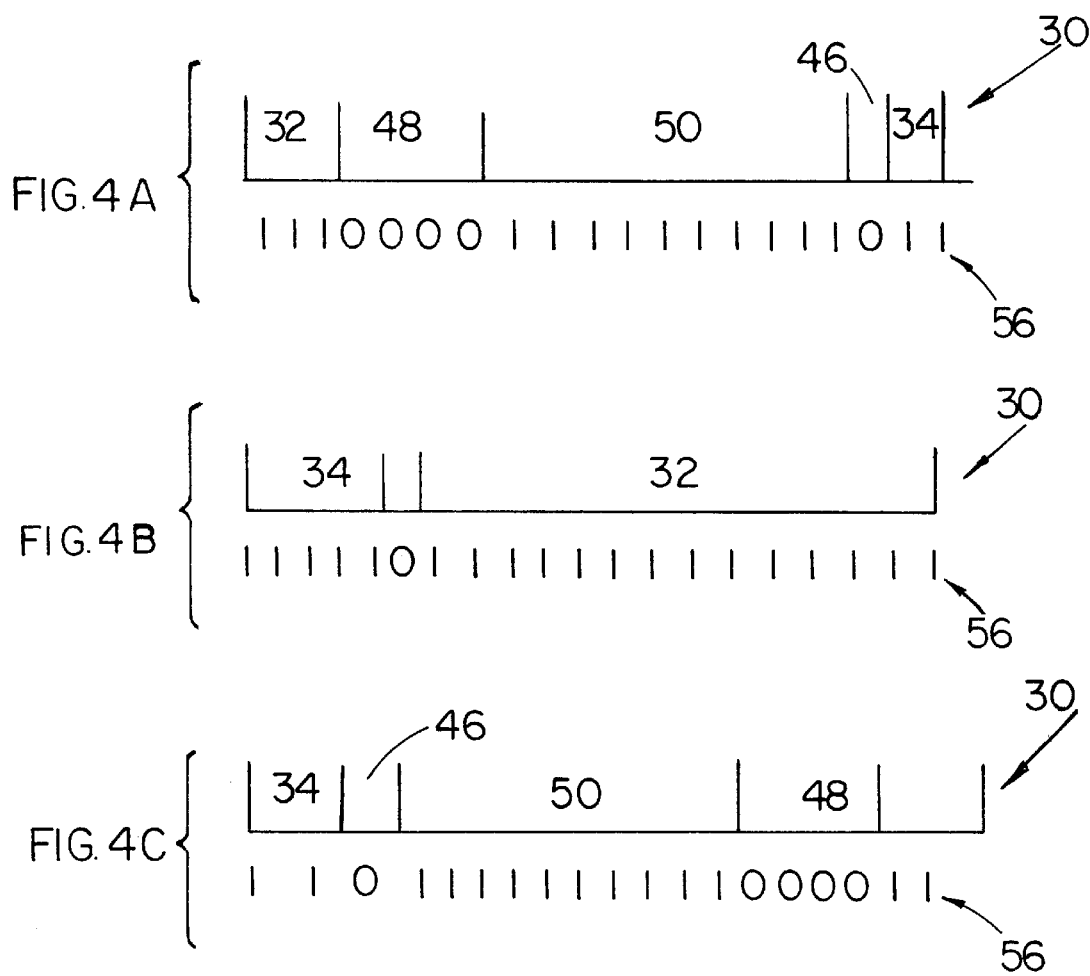
FIG. 3 shows a radiation source and sensor inside the transport mechanism in alignment with one of the edges of the tape cassette.
Figure 3:
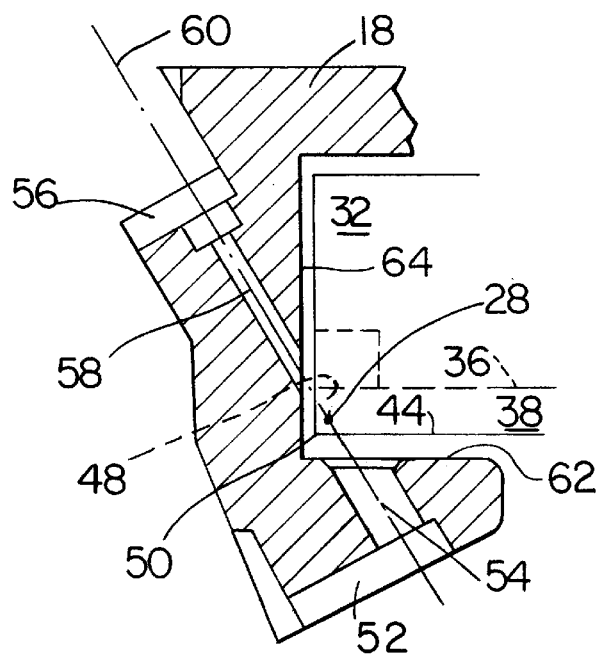

FIG. 1 is a simplified cross sectional view of a prior art magazine-loading DAT drive assembly 10 showing the tape drive 12, the tape cassette magazine 14, the magazine receiving area 16, transport mechanism 18, upper door 20 (for loading single cassettes directly into tape drive 12), and lower door 22 (for leading a magazine containing a plurality of cassettes into with magazine receiving area 16).

Transport mechanism 18 is conventionally provided with a motorized roller mechanism (not shown) for moving the single cassettes (FIG. 2) along longitudinal axis 28 to and from tape drive 12, tape cassette magazine 14, and upper door 20. To that end, it is conventionally also provided with a plurality of sensors (typically photodiodes receiving a collimated source of light from respective light emitting diodes ("LED's")) responsive to the longitudinal position of the tape cassette, so that in the manual loading mode (with transport mechanism 18 aligned with upper door 20) the cassette may be driven forwards at a constant speed by transport mechanism 18 into tape drive 12 after it has been manually inserted up to a predetermined point within transport mechanism 18, and so that it in the magazine loading mode (with transport mechanism 18 initially aligned with tape cassette magazine 14) it may be first driven backwards from tape cassette magazine 14 into transport mechanism 18 and then (after transport mechanism 18 has been raised into alignment with tape drive 12) it may then be driven forwards from transport mechanism 18 into tape drive 12. These sensors are also used to control the unloading of the cassette in a reversal of the above-described loading sequences.

FIGS. 2A and 2B show a conventional DAT tape cassette 30 in the form of a generally rectangular container formed by upper shell 32, hinged lid 34, and lower shell 36. Slider 38 extends from lower left edge 40 across the lower surface of lower shell 36 to lower right edge 44, and is spring biased to a forward position in mating engagement with hinged lid 34, thereby defining a joint 46. When slider 38 is biased (as shown) in its forward position, it leaves an exposed portion 48 of lower shell 36 at the rear of lower left edge 40 and also at lower right edge 44. Thus lower left edge 40 and lower right edge 44 are asymmetrical and mirror images of each other, and in accordance with the present invention, either may be selected as a reference edge having a distinctive non-symmetrical profile including at least one cut-out or transparent edge portion (exposed portion 48) and at least one protruding or opaque edge portion (slider edge 50) and differing from corresponding profiles of all other edges of the DAT tape cassette 30.

FIG. 3 is a lateral cross section of a side portion of transport mechanism 18 showing a radiation source 52 (for example a light-emitting diode) below a lower collimating aperture 54 and a radiation sensor 56 (for example, a biassed photodiode which becomes conductive when illuminated by light from radiation source 52) above upper collimating aperture 58. It will be noted, when not blocked by an opaque portion of DAT tape cassette 30, light from radiation source 52 is free to travel in a straight path through lower collimating aperture 54 and upper collimating aperture 58 to radiation sensor 56, thereby defining a light axis 60 that intersects longitudinal axis 28 (perpendicular to the plane of FIG. 3; see also FIG. 1). On the other hand, light axis 60 and longitudinal axis 28 are so located relative to the lower surface 62 and side surface 64 of transport mechanism 18 that light axis 60 passes diagonally through an edge 40,44 of any DAT tape cassette 30 then inside transport mechanism 18. Accordingly, if the edge portion at the intersection of longitudinal axis 28 and light axis 60 is opaque (for example a lower side edge of slider 38), radiation sensor 56 does not receive any radiation from radiation source 52 and produces a logical "1" as an output; however, if exposed portion 48 is at that intersection, the radiation is not blocked and the output of radiation sensor 56 will be a logical "0".

By sampling and digitizing (for example, by means of a conventional analog to digital circuit) the output of radiation sensor 56 at regular intervals as the DAT tape cassette 30 is advancing at a constant speed toward tape drive 12, a digital "signature" is obtained that corresponds to the profile of the edge of DAT tape cassette 30 in the vicinity of light axis 60. FIG. 4A shows the digitized output of radiation sensor 56 when the cassette is oriented properly with its reference edge in alignment with the sensor; FIG. 4B shows the corresponding digitized output when the cassette is oriented upside down with an completely opaque edge in alignment with the sensor; and FIG. 4C shows the digitized output when the cassette is oriented front to back with a mirror image of the reference edge in alignment with the sensor. It should be noted that in the case of DAT tape cassette 30 shown in FIGS. 2A & 2B, there are two "transparent" portions of lower edges 40,44: a relatively narrow joint 46 and a relatively wide exposed portion 48. Since these two portions are arranged more or less symmetrically, the sampling interval must be sufficiently small to be able to reliably distinguish between such wide and narrow portions. Preferably, the start and stop of the sampling process is determined by conventional cassette position detection logic; however, it is also possible to use known recursive digital filtration techniques to determine the respective probabilities of a match between one or more reference signatures and a candidate signature starting at an unknown point of a continuous serial stream of digital data.

In conventional manner (for example, by using a suitably programmed microprocessor and a conventional multi-point correlation algorithm), once the DAT tape cassette 30 has been driven past light axis 60 by transport mechanism 18, the resultant digital signature from radiation sensor 56 is compared with a typical signature corresponding to a reference edge (for example, the signature for lower left edge 40 shown in FIG. 4A). The algorithm should be able to accommodate a certain amount of noise in the data caused by variations in velocity, surface irregularities, wear and tear and manufacturing variations; at least for a DAT cassette, it is only necessary to distinguish between the three possibilities shown in FIGS. 4A, 4B and 4C. If the resultant output from the correlation algorithm indicates a probable match to the reference signature (FIG. 4A), DAT tape cassette 30 is permitted to continue to advance into tape drive 12; otherwise, transport mechanism 18 is reversed, and the DAT tape cassette 30 is ejected through upper door 20. In the case of a mis-oriented DAT tape cassette 30 stored in tape cassette magazine 14, rather than merely to eject the cassette through upper door 20, it is possible to also eject the tape cassette magazine 14 through lower door 22, thereby giving the operator an opportunity to manually inspect the cassette before it is re-insert with the properly orientation into the magazine. By using the invention to automatically check the orientation of all the cassettes in the magazine before any data operations are performed by tape drive 12, such data operations may be performed at a later time when no operator is present, without any possibility of being interrupted by a mis-oriented cassette.

In alternate embodiments, outputs from a plurality of sensors may be combined to form a signature for the entire profile from an object that has moved only slightly, or even from a stationary object. By correlating the outputs from several sensors, it is also possible to provide a more accurate signature that is less sensitive to variations in velocity.

What is claimed is:

1. Loader mechanism for a tape cassette having generally horizontal top and bottom surfaces and generally vertical left, right, front and rear surfaces which cooperate to define eight horizontal edges, each of said horizontal edges being defined by a respective intersection of one of said horizontal surfaces with one of said vertical surfaces and being associated with a respective horizontal edge axis, said respective horizontal edge axis being disposed a predetermined first distance from said respective vertical surface and a predetermined second distance from said respective horizontal surface and extending in a predetermined parallel direction relative to said respective horizontal and vertical surfaces, one of said eight horizontal edges being a reference edge characterized by a distinctive non-symmetrical edge profile defined by a predetermined sequence of at least one transparent edge portion and at least one opaque edge portion sequentially disposed along the respective edge axis, said distinctive profile of said reference edge differing from corresponding profiles of the seven other horizontal edges, said mechanism comprising:

cassette orientation means for orienting said tape cassette with a selected horizontal surface in a predetermined first transport plane and with a selected vertical surface in a predetermined second transport plane perpendicular to said first transport plane, and with a selected horizontal edge axis defined by said selected horizontal and vertical surfaces coaxial with a predetermined transport axis disposed said predetermined first distance from said first transport plane and disposed said predetermined second distance from said second transport plane, such that if said selected edge of the tape cassette is said reference edge said transport axis passes through said transparent and opaque edge portions, radiation means for projecting radiation along a light axis which intersects said transport axis and which passes obliquely through said vertical and horizontal planes, transport means for transporting said tape cassette along said transport axis in said predetermined direction relative to said vertical and horizontal planes, such that if the selected edge of the tape cassette is the reference edge said transparent and opaque edge portions are transported in said predetermined sequence past the intersection of said transport and light axes, sensor means responsive to said radiation and aligned with said light axis and separated from said radiation means by said transport axis such that an output of said sensor means assumes a first value when a transparent portion of the tape cassette is positioned at the intersection of said transport and light axes, and said output assumes a second value when an opaque portion of the tape cassette is positioned at the intersection of said transport and light axes, and discrimination means responsive to said output of the sensor means for detecting said distinctive non-symmetrical profile to determine if said selected edge is said reference edge.

2. The loader mechanism of claim 1, further comprising means responsive to said discrimination means for ejecting said tape cassette if said selected edge is not said reference edge.

3. The loader mechanism of claim 1, wherein said discrimination means converts the output of the sensor into a digital signature and compares said digital signature with a stored signature corresponding to said distinctive profile.

4. The loader mechanism of claim 1, wherein said tape cassette is a DAT cassette, said reference edge is a predetermined lower side edge of the tape cassette, said opaque edge portion is defined by a slider connecting the two lower side edges of the cassette and normally biassed to a front position in locking engagement with a front lid, and said transparent edge portion is defined by a rear portion of a bottom shell that is exposed when said slider is in said front position.

5. A method for loading a tape cassette having a reference edge which is defined by two predetermined intersecting surfaces and which is characterized by a distinctive non-symmetrical profile including at least one transparent edge portion and at least one opaque edge portion sequentially disposed in a predetermined sequence along the reference edge in a predetermined direction relative to said two predetermined intersecting surfaces, said distinctive profile differing from corresponding profiles of all other edges of the tape cassette, said method comprising:

orienting a selected edge defined by two selected intersecting surfaces of the tape cassette parallel to a transport axis such that if said selected edge is said reference edge, said transport axis passes through said transparent and opaque edge portions, projecting radiation along a light axis which intersects said transport axis and which passes obliquely through said two selected intersecting surfaces, transporting the tape cassette in said predetermined direction along said transport axis, such that different edge portions along said selected edge are transported sequentially past the intersection of said transport and light axes, sensing said radiation along said light axis to produce a first value when a transparent edge portion of the tape cassette is positioned at the intersection of said transport and light axes and a second value when an opaque edge portion of the tape cassette is positioned at the intersection of said transport and light axes, and determining if said selected edge is said reference edge by detecting said non-symmetrical profile based upon said radiation sensed in said sensing step.

6. The method of claim 5, further comprising the step of ejecting said tape cassette if said selected edge is not said reference edge.

7. The method of claim 5, wherein said determining step comprises the steps of converting the results of the sensing step into a digital signature and comparing said digital signature with a stored signature corresponding to said distinctive profile.

8. The method of claim 5, wherein said tape cassette is a DAT cassette, said reference edge is a predetermined lower side edge of the tape cassette, said opaque edge portion is defined by a slider connecting the two lower side edges of the cassette and normally biassed to a front position in locking engagement with a front lid, and said transparent edge portion is defined by a rear portion of a bottom shell that is exposed when said slider is in said front position.

* * * * *